United States Patent Office 3,138,542
Patented June 23, 1964

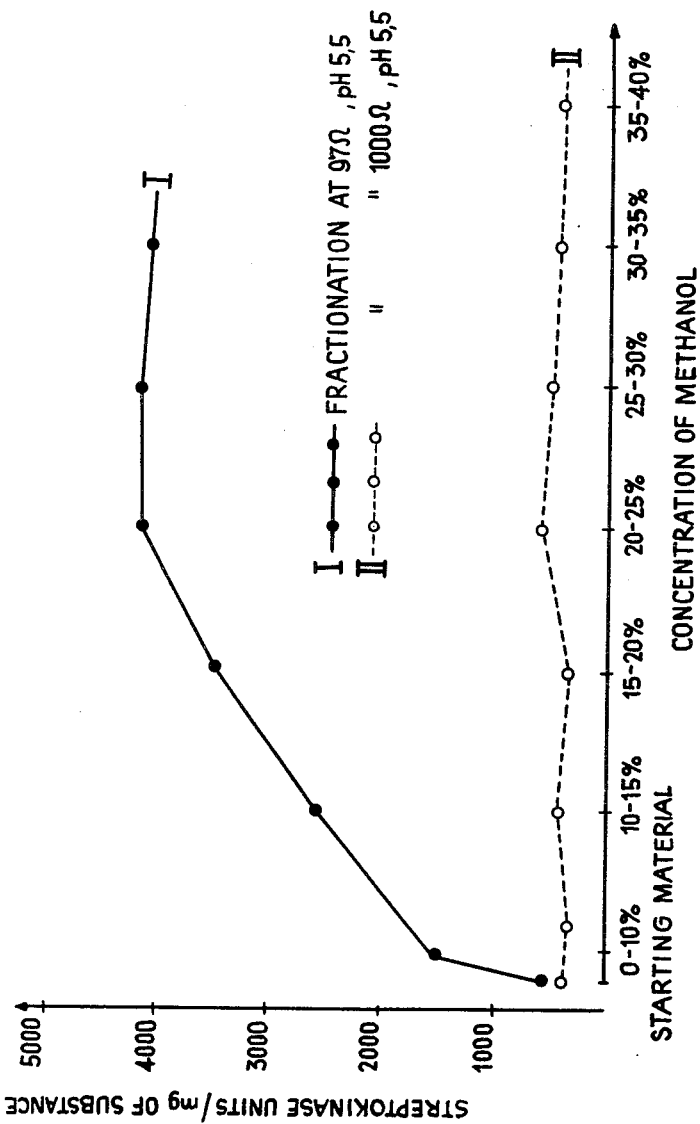

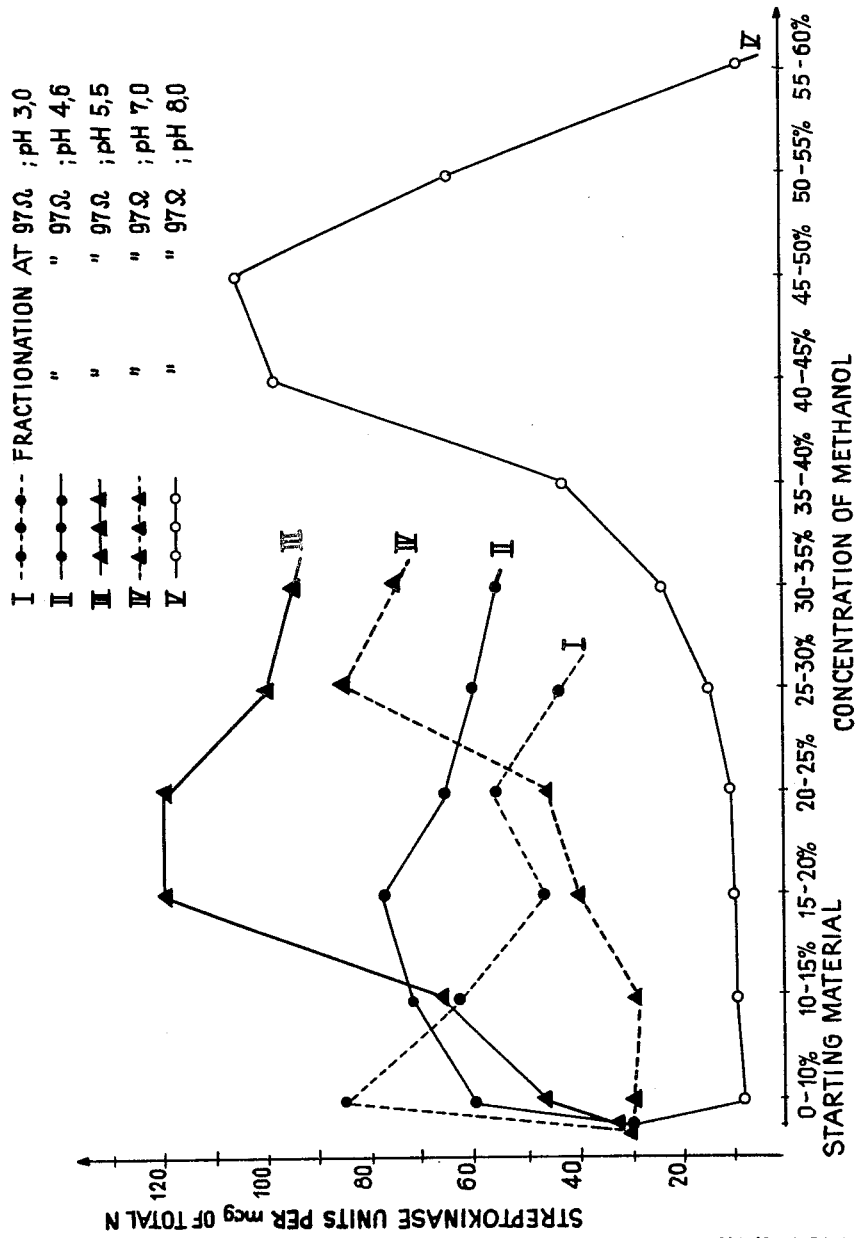

3,138,542
PROCESS FOR THE MANUFACTURE OF A
STREPTOKINASE PREPARATION
Wolfgang von Pölnitz, Frankfurt am Main, Hans Gerhard Schwick, Marburg (Lahn), and Jakob-Hermann Bickhard, Gossfelden, Germany, assignors to Behringwerke Aktiengesellschaft, Marburg (Lahn), Germany, a corporation of Germany
Filed Dec. 20, 1960, Ser. No. 77,066
Claims priority, application Germany Dec. 31, 1959
2 Claims. (Cl. 195—66)

The present invention relates to a process for the manufacture of pure pyrogen-free streptokinase, an enzyme of streptococci.

Streptokinase, a product which has a fibrinolytic and cell disintegrating activity, is produced by bacterial metabolism of certain hemolytic streptococci which, in addition to streptokinase, also form desoxyribonucleases, streptolysin O, hyaluronidase, proteases, and peptidases. When this fibrinolytic and cell disintegrating activity of streptokinase was discovered, attempts were made to make clinical use thereof; thus by locally administering streptokinase in the form of a solution it was tried to remove or to prevent fibrinous deposits in the pleural cavity or to clean wounds, and the like. It was found that streptokinase removed the fibrin barriers which inhibit antibiotics and the humoral defense system from reaching the focus of the disease, and that, when administered intramuscularly or even orally, streptokinase favorably influenced the healing process of inflammations, especially inflammations caused by thrombosis of certain veins. However, the streptokinase isolated hitherto in most cases also contained considerable quantities of fever-causing pyrogens and of the enzymes streptodornase, streptolysin O, and hyalouronidase, which are active even in small quantities. The intravenous administration of streptokinase was, therefore, seriously impeded by the occurrence of many side-effects, for example chills, strong temperature rises, blood pressure drops, etc. There have been made many attempts to purify the streptokinase from these substances which cause such side-effects, but up to now no process is known which allows of preparing pure, pyrogen-free streptokinase.

The attempt has also been made to recover streptokinase, which is produced by growing streptococci, from the culture filtrate. However, the product could be isolated, especially with larger batches, only in a very poor yield. Preparative electrophoresis which allows of splitting up of only small quantities does not offer a suitable basis for a production on an industrial scale. Column chromatography is presently not yet adapted for use in large-scale industrial production.

Now, we have found a process which permits of recovering from streptococci culture filtrates large quantities of pure, pyrogen-free streptokinase which does not possess the disadvantages mentioned above of the preparations hitherto known and which is well tolerated when administered intravenously. In the process of the present invention the streptokinase is purified by removal of the by-products by precipitation with calcium phosphate, methanol, and ammonium sulfate, it being possible to apply methanol and calcium phosphate in reversed order. The process is effected in such a manner that filtrates of streptococci cultures, after elimination of the undesired streptolysin in a manner as such known by treatment with calcium phosphate, are precipitated by means of methanol, the protein concentration being in the range from 0.05 to 5.00%, preferably from 0.2 to 1.0%, the salt content of the solution—expressed in terms of resistance—being in the range of 50 to 200 ohms, the solution to be precipitated having a pH-value ranging from 4.0 to 7.5, preferably from 5.0 to 6.0, the methanol concentration ranging from 15 to 35%. Said precipitation is effected at a temperature in the range from 0° to −15° C., preferably 0 to −5° C. From the streptokinase solution so obtained, a fraction that contains mainly unspecific protein compounds is separated while stirring mechanically at a pH-value ranging from 5.0 to 8.0, preferably from pH 6.5 to 7.5, with the aid of a saturated solution of ammonium sulfate, said separation being effected at a temperature ranging from 1 to 30° C., preferably from 15 to 25° C., with a protein content of 0.1 to 5.0%, preferably 0.2 to 1.0%, and an ammonium sulfate saturation of 27–33%, preferably 29–31%. The ammonium sulfate content of the liquid phase of the centrifuged solution is increased, while stirring mechanically at a pH ranging from 5.0 to 8.0, preferably from 6.5 to 7.5 and at a temperature ranging from 1 to 30° C., preferably 15 to 25° C., so as to obtain a saturation of 27 to 60%, preferably 29 to 45%. The streptokinase precipitated thereby is isolated, for example by centrifugation, and, if desired, lyophilized, while hyaluronidase and streptodornase remain in the mother liquor.

In particular, the new process is advantageously effected in such a manner that the culture filtrates, which at first are enriched by ultrafiltration, are purified by means of calcuim-phosphate in order to remove streptolysin according to the method described by Herbert and Todd (Bioch. J. 35, 1124, 1941). In the following precipitation by means of methanol it is necessary that the solutions used for the methanol precipitation have a high salt content, i.e. that their resistance does not exceed 200 ohms. If the resistance is higher, a specific precipitation of highly active material cannot be expected to take place. There will rather be obtained precipitates which differ in purity only slightly from the starting material. FIGURE 1 illustrates these conditions. The methanol concentrations are indicated on the abscissa, whereas on the ordinate are given the Christensen units of streptokinase per milligram of dry substance. It results from this figure that with a high salt content, in the present case 97 ohms, and a pH-value of the solution of 5.5, the purity of the precipitates increases together with the methanol content up to a limit value, whereas with a resistance of 1000 ohms and a pH-value of 5.5, the content of Christensen units of streptokinase per milligram of dry substance remains the same in all precipitates.

A further factor which is of considerable importance for optimum precipitation with methanol is the pH-value of the solution. Depending on whether the solution is more acidic or more alkaline, maximum purification is effected at different methanol concentrations. Also with regard to purification effect and yield, there exist considerable differences. FIGURE II, in which the abscissa gives the methanol concentrations and the ordinate the Christensen units per microgram total nitrogen, shows that at the pH-value of 3 the optimum specific precipitation takes place already in the range from 0 to 10% of methanol, whereas with the following methanol concentrations the purity decreases. At pH 4.6, the optimum is at 20%; however, here the purification cannot be considered to be very good. At pH 5.5, the conditions are quite different. In this case optimum precipitation is in the range of from 20 to 25%, a 4-fold purification being achieved. With increasing pH, the optimum of the specific precipitation shifts more and more to higher methanol concentrations; at the pH of 7.0, the maximum is between 25 and 30%, and at the pH of 8 it is between 45 and 50%. Although it is noteworthy that at pH 8 the purification is approaching the values obtained at pH 5.5, the yield is unsatisfactory, as results from the following table, due to the high methanol concentration and the numerous precipitations always involving some streptokinase.

TABLE. — YIELDS OF STREPTOKINASE UNITS BY METHANOL FRACTIONATION OF CRUDE STREPTOKINASE

| pH of precipitation | Resistance ohms | Methanol fractionation range, percent | Yield, percent |
| --- | --- | --- | --- |
| 3.0 | 97 | 0–15 | 30 |
| 4.6 | 97 | 0–30 | 45 |
| 5.5 | 97 | 15–35 | 60 |
| 7.0 | 97 | 25–35 | 25 |
| 8.0 | 97 | 45–55 | 15 |

The temperature at which the precipitation is effected and which must be below 0° C., preferably in the range from −3 to −5° C., is also of decisive importance. When it is 0° C., too strong an activation is to be expected, when it is below −5° C., too many unspecific proteins will be precipitated simultaneously. It has already been stated that at different pH values the yield of precipitate is also quite different.

As results from the foregoing, the precipitation with methanol is then best, when it is effected at a resistance of between 50 to 200 ohms, at a pH-value from 4.0 to 7.5, preferably between 5.0 and 6.0, with 15–35% of methanol, preferably 25–30%, and at a temperature ranging from 0 to −15° C., preferably from 0 to −5° C. In the process of the present invention, the methanol precipitation is followed by an ammonium sulfate precipitation. At first, a pre-precipitate consisting essentially of unspecific protein compounds is separated and the streptokinase is caused to precipitate by increasing the saturation with ammonium sulfate. The residual quantities of streptodornase and hyaluronidase remain behind in the mother liquor after the methanol precipitation. It is surprising that such a purification could be achieved by ammonium sulfate fractionation, since in preliminary tests with culture filtrates there could not be attained an increase of the biological activity with ammonium sulfate. It appears, therefore, that the precipitation with ammonium sulfate succeeds only when it is applied to a pre-purified product.

The streptokinase preparations prepared in accordance with the present invention exhibit in Tiselius' electrophoresis apparatus of Beckmann Instruments Inc., Fullerton, California (phosphate buffer pH 7.5; $\mu=0.15$, and 2° C.) a mobility of $-\mu \times 10^5$ cm.$^2$ sec.$^{-1}$ volt$^{-1}$=3.8 and in the ultracentrifuge of Beckmann a sedimentation coefficient of $3.0 \times 10^{13}$ cm.$^2$ sec.$^{-1}$ dyn.$^{-1}$. They are highly purified and practically free from streptodornase, streptolysin O and hyaluronidase and do not contain pyrogens. If desired, they may also be lyophilized to form a dry preparation. The streptokinase content of these preparations is about 450 units/microgram of total nitrogen. They contain less than 2 units of hyaluronidase, less than 10 units of streptodornase and less than 5 units of streptolysin, per 100,000 units of streptokinase.

In order to prove its effectiveness and tolerability, the substance produced according to the present invention was clinically tested in patients suffering from thrombosis of the arterial or veinous circulatory system. The dosage may amount to 300,000 units daily, administered in physiological glucose solution by infusion in the course of 4–5 hours. The product was well tolerated. Side-effects such as temperature rises, chills, and blood pressure drops were not observed. The absence of pyrogens was proven by an examination according to the test method described in Title 42 Public Health, Chapter I, Public Health Service, Federal Register, vol. 25, pp. 6134/6135, June 30, 1960. This examination was effected in rabbits by measurements of the body temperature before the intravenous injection of the streptokinase solution to be tested and after the injection in hourly intervals up to 6 hours thereafter. The body temperature of the rabbits was measured by means of a thermoelectric measuring device having an accuracy of ±0.05° C. Only healthy rabbits that had a body weight of about 1.8 to 2.2 kg. were selected for the examination. They were kept in single cages in uniformly heated, quiet stables. Animals whose body temperature prior to the injection was below 38.5° C. or above 39.5° C. were not used for the examination. Animals whose body temperature exhibited temperature variations of more than ±0.3° C., too, were not used for the test. The streptokinase solution was injected into the ear veins of 5 rabbits. The streptokinase preparations obtained by the process of the present invention were subjected to the above examination and were found to be free from pyrogens.

The determination of enzymes was carried out according to the following test methods:

Streptokinase: Christensen, L. R., J. Clin. Invest. 28, 163, 1949.
Streptodornase: M. Kunitz, J. Gen. Physiol. 33, 363, 1950.
Streptolysin O: Minimum Requirements: Streptokinase-Streptodornase, paragraph 3, 21. National Institutes of Health, May 1, 1951.
Hyaluronidase: Dorfman, A., and M. L. Ott, J. Biol. Chem. 172, 367, 1948.

The following example illustrates the invention but it is not intended to limit it thereto:

Example 1000 liters of a streptokinase-containing culture filtrate from streptokinase-forming streptococci having a streptokinase content of 30 units/microgram of nitrogen and 12,000 units of hyaluronidase, 15,000 units of streptodornase and 9000 units of streptolysin O per 100,000 units of streptokinase, were concentrated by ultrafiltration to a volume of 15 liters. After having adjusted the pH-value to 5.5 by means of acetic acid, the resistance of the solution was about 60 ohms. The solution was then cooled to a temperature in the range from −1 to −4° C., and methanol was added until the solution showed a methanol concentration of 30%. The residue, obtained by centrifugation, was dissolved in distilled water, 1 N-calcium acetate solution (25 ml./l. solution) was added to this solution and the pH of the solution was adjusted to 7.3 by means of a solution of secondary sodium phosphate. A calcium phosphate deposit formed which was then separated from the solution by centrifugation. To the liquid portion of the centrifuged solution was added a saturated ammonium sulfate solution, at pH 7.5 and with mechanical stirring, until the solution showed a saturation of 29.5%, the precipitate formed was removed by centrifugation and the ammonium sulfate content of the liquid portion was raised, while stirring mechanically, to the extent of a saturation of 42%. The precipitate, which was isolated in a cooled centrifuge, consisted of streptokinase that had a nitrogen content of 450 units/microgram nitrogen and was practically free from pyrogens as well as from hyaluronidase, streptodornase, and streptolysin O (less than 2 units hyaluronidase, less than 10 units of streptodornase, and less than 5 units of streptolysin O, per 100,000 units of streptokinase). The enrichment effected by the process of the present invention, referred to nitrogen, was thus a 15-fold enrichment.

We claim:

1. A process for preparing pure, pyrogen-free streptokinase wherein culture filtrates of streptococci cultures, after elimination of streptolysin by treatment with calcium phosphate, are precipitated by means of methanol, the protein concentration being in the range from 0.05 to 5.00%, the salt content of the solution—expressed in terms of resistance—being in the range between 50 and 200 ohms, the solution to be precipitated having a pH value ranging from 4.0 to 7.5, the methanol concentration being in the range from 15 to 35%, said precipitation is effected at a temperature ranging from 0° to −15° C., and a pre-fraction that contains mainly unspecific protein compounds is separated with the aid of a saturated ammonium sulfate solution from the streptokinase solution so obtained, while stirring mechanically and at a pH ranging from 5.0 to 8.0, said separation being effected at a temperature in the range from 1 to 30° C. and with a protein content of 0.1 to 5.0% and an ammonium sulfate saturation of 27-33%, the ammonium sulfate content of the liquid layer of the centrifuged solution is increased, while stirring mechanically and at a pH ranging from 5.0 to 8.0 and at a temperature ranging from 1 to 30° C., so as to obtain a saturation of 27-60%, and the streptokinase precipitated thereby is then isolated by centrifugation and lyophilized, while hyaluronidase and streptodornase remain in the mother liquor.

2. A process for preparing pure, pyrogen-free streptokinase wherein culture filtrates of streptococci cultures, after elimination of streptolysin by treatment with calcium phosphate, are precipitated by means of methanol, the protein concentration being in the range from 0.2 to 1.0%, the salt content of the solution—expressed in terms of resistance—being in the range between 50 and 200 ohms, the solution to be precipitated having a pH value ranging from 5.0 to 6.0, the methanol concentration being in the range from 15 to 35%, said precipitation is effected at a temperature ranging from 0 to $-5°$ C., and a prefraction that contains mainly unspecific protein compounds is separated with the aid of a saturated ammonium sulfate solution from the streptokinase solution so obtained while stirring mechanically at a pH value ranging from 6.5 to 7.5, said separation being effected at a temperature in the range from 15 to 25° C. and with a protein content of 0.2 to 1.0% and an ammonium sulfate saturation of 29–31%, the ammonium sulfate content of the liquid layer of the centrifuged solution is increased, while stirring mechanically at a pH ranging from 6.5 to 7.5 and at a temperature ranging from 15–25° C., so as to obtain a saturation of 29–45%, and the streptokinase precipitated thereby is then isolated by centrifugation and lyophilized, while hyaluronidase and streptodornase remain in the mother liquor.

References Cited in the file of this patent

UNITED STATES PATENTS

| | | |
|---|---|---|
| 2,677,643 | Ablondi | May 4, 1954 |
| 2,881,114 | Homan | Apr. 7, 1959 |
| 2,997,425 | Singher et al. | Aug. 22, 1961 |
| 3,016,337 | Singher et al. | Jan. 9, 1962 |
| 3,042,586 | Siegel et al. | July 3, 1962 |

OTHER REFERENCES

Fletcher et al.: Proc. Soc. Expt. Med. & Biology, vol. 94 (1957), pp. 233–236.